United States Patent Office 2,846,426
Patented Aug. 5, 1958

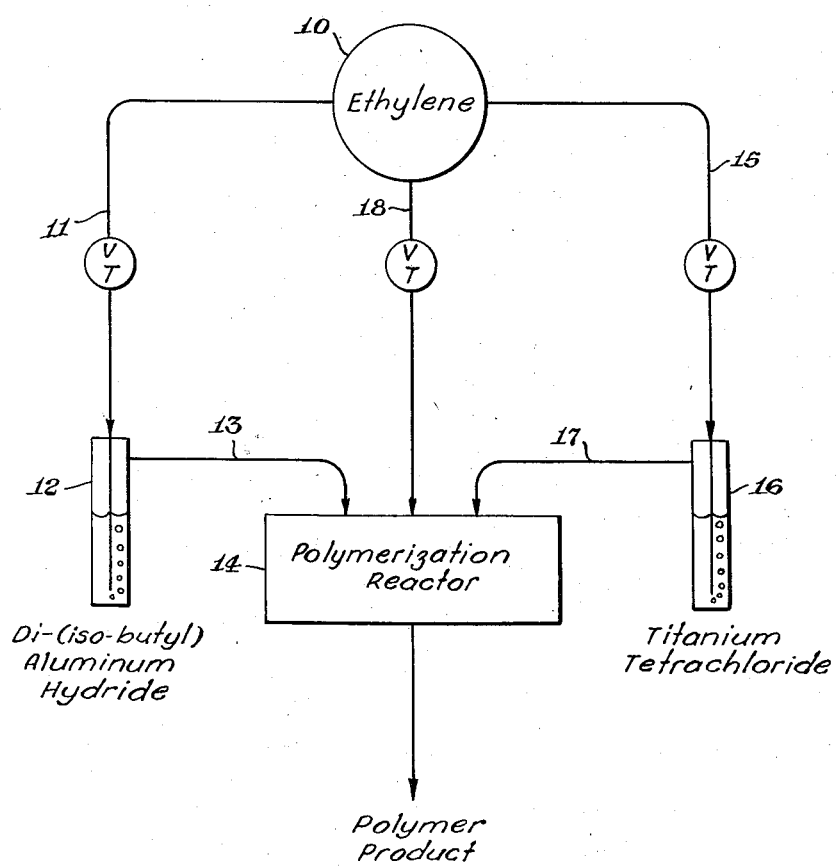

2,846,426

POLYMERIZATION IN VAPOR PHASE WITH COMPLEX METAL CATALYSTS

Winston E. Larson, Lake Jackson, and Richard E. Edmonson, Freeport, Tex., assignors to The Dow Chemical Company, Midland, Mich., a corporation of Delaware Application December 8, 1955, Serial No. 551,908

12 Claims. (Cl. 260—94.9)

This invention relates to the polymerization of polymerizable organic materials, especially alpha-olefins, that are in the gas state at the temperature and pressure of polymerization, such as ethylene, and wherein the polymerization is catalyzed by complex organo-metal catalysts. It particularly pertains to a mode of operation wherein the polymerizable organic material and the catalyst-forming starting materials are prepared in the form of at least two separate vaporous compositions, each of such vaporous compositions containing a part only of the components intended for the ultimate polymerization reaction mixture and each of such compositions being non-reactive by itself, and admixing such vaporous compositions whereby the active complex organo-metal catalyst is generated in situ in the vaporous mixture comprising the polymerizable organic material.

Recent developments in the making of polymers such as polyethylene have involved the use of complex organometal catalysts, whereby high molecular weight products can be obtained at relatively low pressures, e. g. at pressures below 100 atmospheres, and at relatively low temperatures, e. g. from 50° to 100° C. The solid polymer products thereby obtained have high molecular weights, e. g. from 30,000 to 300,000 or more, softening points in the order of 130° C. and above, and specific gravities in the order of 0.94 and above. The complex organometal catalysts that are employed to effect such polymerization are formed, for example, by mixing a strong reducing agent such as a trialkyl aluminum compound and a compound of a heavier metal of group IV–B, V–B, or VI–B, i. e. metals of the left-hand subgroup of groups IV, V, and VI, of the periodic system of the elements. For example, a complex organo-metal catalyst that is effective in causing ethylene to polymerize to a high molecular weight polymer product is prepared by admixing triisobutyl aluminum with titanium tetrachloride.

It is not known precisely what is the structure of such complex organo-metal catalysts. It is known that a chemical reaction occurs on admixing the moieties, e. g. the trialkylaluminum compound and the heavier metal compound; heat is evolved, a change in color occurs, and a precipitate sometimes forms. It is also known that the resulting composition is catalytically different from either of the catalyst-forming starting ingredients alone. It has been proposed that the catalytically active entity is a lower valence compound or organic complex of the heavier metal. Herein, the term "complex organo-metal catalyst," or, more simply, "catalyst," will be employed as meaning the catalytically active composition, whatever its structure, of a kind prepared in the manner described by admixing catalyst-forming starting materials comprising a strongly reducing organo-metal material and a heavier metal compound of group IV–B, V–B, or VI–B of the periodic system.

In practicing this prior method, a polymerizable alpha-olefin, e. g. ethylene, is contacted with a complex organo-metal catalyst, usually while having the catalyst dispersed in an inert liquid diluent as medium for the polymerization.

The properties of the resulting polymeric product, especially the molecular weight and moldability, e. g. of polyethylene, are affected, often to a considerable extent, by such variables as the kind of catalyst-forming ingredients, the relative proportions thereof to one another, and the proportion of catalyst relative to the polymerizable olefin. Furthermore, it has been observed in batch modes of operation that some of the properties of the portion of polymer formed at any particular instant tend to change during the course of the polymerization.

For these reasons it is difficult to carry out such polymerization processes and to obtain consistently a polymeric product having uniform and desired properties. The principal difficulties involved seem to be in controlling the relative rates of feeding the catalyst-forming ingredients to the catalyst composition, and in controlling the proportion of active catalyst relative to the polymerizable olefin.

An object of this invention is to provide an improved method for polymerization of polymerizable organic materials in contact with complex organo-metal catalysts.

A more specific object is to provide such a method wherein the polymerizable material is an alpha-olefin.

A still more specific object is to provide such a method wherein the polymerizable material is ethylene.

A still more particular object is to provide such a method and novel means for controlling the relative rates of feed of the catalyst-forming starting materials and for controlling the proportion of the active catalyst composition relative to the polymerizable material.

Other objects and advantages of the invention will be evident in the following description.

The objects of this invention have been attained in a method wherein the polymerizable organic material, e. g. a polymerizable alpha-olefin such as ethylene, and the catalyst-forming materials are prepared in the form of at least two separate vaporous compositions, each of such vaporous compositions containing a part only of the components intended for the ultimate polymerization mixture, each of such vaporous compositions being free of at least one essential component required for formation of the complex organo-metal catalyst and being non-reactive by itself, and admixing such vaporous compositions whereby the catalyst-forming materials interact to generate the complex organo-metal catalyst in situ in the vaporous mixture comprising the polymerizable material, which polymerizable material is thereby caused to polymerize.

The drawing is a stylized diagram of one exemplary embodiment for carrying out this method.

In practice of the method, vaporizable catalyst-forming starting materials are selected that are capable of interaction on admixing to form complex organo-metal catalysts of the kind hereinbefore described, i. e., a vaporizable strongly reducing organo-metal compound, and a vaporizable compound of a heavier metallic element of groups IV–B, V–B, and VI–B of the periodic table. Examples of vaporizable organo-metal compounds are alkyl aluminum compounds having one of the generic formulae $R_3Al$, $R_2AlH$, $RAlH_2$, $R_2AlX$, and $RAlX_2$, wherein the symbol R represents an alkyl radical and the symbol X represents a halogen atom, i. e. trialkyl aluminum compounds such as trimethyl aluminum, triethyl aluminum, tripropyl aluminum, tri-isobutyl aluminum, and trioctyl aluminum, alkyl aluminum hydrides such as diethyl aluminum hydride, ethyl aluminum dihydride and di-(isobutyl)-aluminum hydride, and alkyl aluminum halides such as diethyl aluminum chloride and ethyl aluminum dichloride. Examples of vaporizable heavier metal compounds are the halides, oxyhalides, and certain of the organic derivatives such as the acetylacetonates of metals of groups IV–B, V–B, and VI–B, such as titanium tetrachloride and zirconium acetylacetonate.

Separate vaporous and homogeneous compositions are then prepared, one of which comprises one of the vaporizable catalyst-forming starting materials, e. g. the vaporizable organo-metal compound such as an alkyl aluminum compound, and another one of which vaporous compositions comprises the other of the vaporizable catalyst-forming starting materials, e. g. the vaporizable heavy metal compound such as titanium tetrachloride. Each of such separate vaporous compositions comprising one of the catalyst-forming starting materials must be free of the other catalyst-forming starting material. Any or all of such separate vaporous compositions can also comprise the polymerizable organic starting material.

Such vaporous compositions are readily prepared by passing a stream of gas through a vessel containing one of the catalyst-forming vaporizable starting materials and contacting the gas stream with such catalyst-forming material to obtain a vaporous composition that comprises and is usually saturated with the catalyst-forming starting material at the prevailing temperature and pressure. Since the vapor-pressure of the catalyst-forming starting materials varies in known manner with its temperature, the proportion of catalyst-forming material thereby supplied to the gas stream is readily controlled and regulated by controlling the rate of flow of the gas stream, the temperature of the body of the catalyst-forming material, and the temperature and pressure of the resulting vaporous composition.

Streams of the resulting separate vaporous compositions, each containing one of the catalyst-forming starting materials and being free of one of such catalyst-forming starting materials, are then fed to a reaction zone and intermixed therein. The relative rates of feeding such streams can readily be controlled, thereby affording ready and positive means of control of the relative rates of feed of the catalyst-forming starting materials into admixture with one another.

The polymerizable starting material, e. g. the alpha-olefin such as ethylene, can be fed into the reaction zone as a component of one or all of the vaporous compositions comprising the catalyst-forming starting materials, and/or such polymerizable starting material can be fed into the reactor as a separate vaporous composition that is free of all catalyst-forming metal compounds. By controlling the rates of feeding such streams of vaporous compositions, control of the concentration of the complex organo-metal catalyst relative to the polymerizable material is readily obtained.

Any of the vaporous compositions can also contain chemically inert diluents such as inert elemental or hydrocarbonaceous gases, e. g. nitrogen, argon, methane, ethane or the like. Materials that are known to inactivate the complex organo-metal catalyst, such as water and other active hydrogen-containing materials, oxygen, acetylene, and oxides of carbon, should be excluded from the reaction zone.

The admixture of the vaporous composition comprising the catalyst-forming starting materials in the reaction zone results in the formation in situ of a very active complex organo-metal catalyst. In the presence of such catalyst, the polymerizable material in such vaporous mixture readily polymerizes to a high molecular weight polymeric product. Further control of the polymerization reaction is obtained by control of the temperature in the reaction zone, usually between room temperature and about 250° C., and by control of the pressure, usually between atmospheric pressure and a pressure of about 100 atmospheres, although any obtainable pressure can be used.

From the reaction zone the high molecular weight polymeric product can be withdrawn in usual ways. In some instances the polymer deposits as a layer on the interior surfaces of the walls of the reactor defining the polymerization reaction zone. In such cases, the reactor can be equipped with scraper blades or plowing devices to free the polymer and permit its removal from the reactor. Alternatively, solvents for the polymer can be sprayed into the reactor to extract the polymer product, although it is a feature of the present process that the polymerization reaction can be carried out without the use of a liquid diluent. When the operations are carried out at temperatures above the softening point of the polymer product, the latter can often be drawn from the reaction zone as a heat-plastified or molten mass.

The following specific example illustrates polymerization of ethylene and preparation of a high molecular weight polyethylene by the method of this invention, but should not be construed as limiting its scope. In the description, reference is made to elements shown schematically in the drawing.

Example

A stream of ethylene gas from source 10 was passed via a line 11 through a flow control valve at an average rate of 0.15 cubic foot per minute and was bubbled into and through a vessel 12 containing di-(isobutyl)aluminum hydride at a temperature of 60° C., thereby vaporizing the di-(isobutyl) aluminum hydride at an average rate of $5.2 \times 10^{-6}$ gram-mole per minute and forming a vaporous composition that was fed through line 13 into the polymerization reactor 14.

Another stream of ethylene gas from source 10 was passed via line 15 through a flow control valve at an average rate of 160 cubic centimeters per minute and was bubbled into and through a vessel 16 containing titanium tetrachloride at a temperature of 28° C. thereby vaporizing the titanium tetrachloride at an average rate of $1.36 \times 10^{-4}$ gram-mole per minute and forming a vaporous composition that was fed through line 17 into the polymerization reactor 14.

A third stream of ethylene gas from source 10 was passed via line 18 through a flow control valve at an average rate of 0.15 cubic foot per minute was passed into the polymerization reactor 14.

The mixture of the several vaporous compositions in the polymerization reactor 14 occurred at substantially atmospheric pressure and at a temperature of about 60° C.

A polyethylene product was formed as a film or sheet lining the inside wall of the polymerization reactor 14. The molecular weight of this polyethylene product was about 110,000.

It will be observed in the foregoing description that the mechanical control of the process was obtained entirely by controlling the rates of flow of ethylene gas through lines 11, 15, and 18. The control of the rates of feeding the catalyst-forming ingredients was inherent in their respective vapor pressures at the temperatures employed and the rate of bubbling ethylene gas therethrough. Since compounds such as titanium tetrachloride and di-(isobutyl)aluminum hydride are hazardous to handle, the present procedure for feeding and controlling the rate of feeding such materials into the polymerization reaction zone is especially advantageous.

In place of ethylene, the vaporous mixture in the polymerization reaction zone can contain another ethylenically unsaturated polymerizable organic material, especially one that contains a vinylidene radical, i. e. the group $CH_2=C<$, and particularly an alpha-olefin such as propylene, 1-butene, isobutylene, styrene, or mixture thereof.

We claim:

1. In a method for making high molecular weight polymeric products by polymerizing a polymerizable organic material in contact with a complex organo-metal catalyst formed by admixing a vaporizable alkylaluminum compound and a vaporizable compound of a heavier metal selected from the class consisting of the metals of groups IV-B, V-B, and VI-B of the periodic system of the elements, the improvement which comprises forming at least two separate vaporous compositions, each of which contains a part only of the components necessary for the polymerization reaction mixture, one of which vaporous compositions contains one only of the vaporizable catalyst-forming starting materials, another of which vaporous compositions contains the other only of the vaporizable catalyst-forming starting materials, at least one of the vaporous compositions containing a polymerizable organic material, and admixing the several vaporous compositions, whereby a complex organo-metal catalyst is generated in situ and polymerization of the polymerizable organic material is effected.

2. The improvement according to claim 1 wherein the polymerizable organic material is an alpha-olefin.

3. The improvement according to claim 1 wherein the polymerizable organic material is ethylene.

4. The improvement according to claim 1 wherein the compound of a heavier metal is a vaporizable titanium compound.

5. In a method for making a high molecular weight polymer of ethylene by polymerizing ethylene in contact with a complex organo-metal catalyst formed by admixing a vaporizable alkylaluminum compound and a vaporizable compound of a heavier metal of group IV-B of the periodic system of the elements, the improvement that comprises forming at least two vaporous compositions, each of which is free of at least one of the catalyst-forming metal compounds starting materials, one of which vaporous compositions contains a vaporizable alkylaluminum compound as the sole metal compound, another of which vaporous compositions contains a vaporizable compound of a heavier metal of group IV-B of the periodic system of the elements as the sole metal compound, at least one of the vaporous compositions containing ethylene, and admixing the several vaporous compositions, whereby a complex organo-metal catalyst is generated in situ and polymerization of ethylene is effected.

6. The improvement according to claim 5 wherein the compound of a heavier metal of group IV-B is a vaporizable titanium compound.

7. The improvement according to claim 6 wherein the titanium compound is titanium tetrachloride.

8. A method for making a high molecular weight polyethylene product, which method comprises contacting a stream of gas comprising ethylene with a vaporizable alkylaluminum compound to obtain a gas composition (A) comprising ethylene and such alkylaluminum compound, contacting another stream of gas comprising ethylene with a vaporizable compound of a metal of group IV-B of the periodic system of the elements to obtain a gas composition (B) comprising ethylene and such metal compound, the alkylaluminum compound and the compound of the group IV-B metal being capable of interaction to form a complex organo-metal catalyst for polymerization of ethylene, feeding at least two gas streams comprising ethylene and including gas compositions (A) and (B) to a polymerization reaction zone, and admixing such gas compositions in the polymerization reaction zone at temperatures between room temperature and 250° C., thereby generating a complex organo-metal catalyst in situ in the presence of ethylene whereby the ethylene is polymerized to a high molecular weight polyethylene product.

9. A method according to claim 8 wherein the compound of a metal of group IV-B of the periodic system is a vaporizable compound of titanium.

10. A method according to claim 9 wherein the compound of titanium is titanium tetrachloride.

11. A method for making a high molecular weight polyethylene product, which method comprises bubbling a stream of gas comprising ethylene through a liquid body of a vaporizable alkylaluminum compound to obtain a gas composition (A) comprising ethylene and such alkylaluminum compound, bubbling a stream of gas comprising ethylene through a liquid body of a vaporizable compound of titanium to obtain a gas composition (B) comprising ethylene and such compound of titanium, the alkylaluminum compound and the compound of titanium being capable of interaction to form a complex organo-metal catalyst for polymerization of ethylene, feeding at least two gas streams comprising ethylene and including gas compositions (A) and (B) to a polymerization reaction zone, controlling the rates of feeding of ethylene and of the catalyst-forming alkylaluminum compound and compound of titanium by controlling the rates of flow of the several gas streams and by controlling the temperature of the liquid body of vaporizable alkylaluminum compound and the temperature of the liquid body of vaporizable compound of titanium, admixing the feed gas streams in the polymerization reaction zone at temperatures between room temperature and 250° C., thereby generating a complex organo-metal catalyst in situ in the presence of ethylene whereby the ethylene is polymerized to a high molecular weight polyethylene product.

12. A method according to claim 11 wherein the vaporizable compound of titanium is titanium tetrachloride.

References Cited in the file of this patent

UNITED STATES PATENTS

| | | |
|---|---|---|
| 1,574,507 | Oberfell et al. | Feb. 13, 1926 |
| 2,245,721 | Ross et al. | June 17, 1941 |
| 2,475,628 | McSweeney | July 12, 1949 |

FOREIGN PATENTS

| | | |
|---|---|---|
| 533,362 | Belgium | May 16, 1955 |